Sept. 10, 1940.   A. NAPOLILLO   2,214,475
DOUGH CUTTER
Filed Jan. 15, 1940

Angelo Napolillo
INVENTOR.
BY Clarence E. Threedy
HIS ATTORNEY.

Patented Sept. 10, 1940

2,214,475

UNITED STATES PATENT OFFICE 2,214,475

DOUGH CUTTER

Angelo Napolillo, Chicago, Ill.

Application January 15, 1940, Serial No. 313,805

4 Claims. (Cl. 107—47)

This invention relates to a form of dough cutter or divider of the type adapted to sever a portion of dough from a larger mass and to provide certain scalloping in the region adjacent the severed parts.

A particular object of the invention is the provision of an improved mold or die portion which is especially adapted to be inserted in and removed from a recessed holder, the die being in the preferred shape of an annulus having extensions which fit into the recessed sleeve portion of a cooperating holder or cutter.

Yet another object is the provision of interfitting complementary embossed parts on the holder and insert for locking the parts in operative assembly.

A further object is the provision of a tubular cutter or holder having a peripheral cutting edge with offset wall portions adjacent said edge providing a seating means for a removable molding insert.

Yet another object is the provision of a scalloping mold or die of generally annular shape having finger extensions yieldably engageable with the inner sleeve portion of a holder to secure the die in mounted condition, the preferred arrangement further including the provision of complementary embossed parts on the fingers and sleeve portion further locking the die or mold in place.

Still another object is the provision of an improved cutter including a split ring having extensions adapted to press against the cylindrical sleeve portion of a holder or cutter part cooperably with the expansive effort of the ring, whereby to secure the mold in position in the holder.

Other objects, advantages and novel aspects of the invention reside in certain details of construction as well as the cooperative relationship of the component parts of the illustrative embodiment described hereinafter in view of the annexed drawing, in which.

Figure 1:
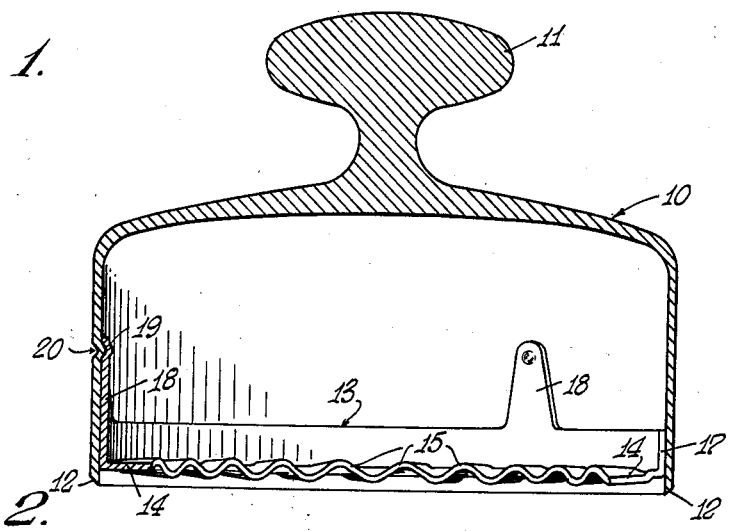
Fig. 1 is a vertical section through the holder and cutter or die.

Referring to Fig. 1, the improved cutter includes a holder and cutter member 10 in the form of an inverted cup element having a handle portion 11 on the top portion and having a cutting rim 12 which is effective to sever a quantity of dough from a larger strip on the board when the cutter is forced into the strip, or to shear or trim the dough from around the edges of a pan, the rim of which may be fitted into the holder.

In order to apply a certain design configuration to the severed portion of the dough, there is provided a mold or die generally indicated at 13 and fitted removably into the cylindrical sleeve portion of the cutter or holder, this die having an annular flange portion 14 undulated to provide a series of scallops 15 which are pressed into the portions of the dough adjoining the severed part thereof and which are effective to impress a scalloped configuration into the dough at the time of severing or cutting.

Figure 3:
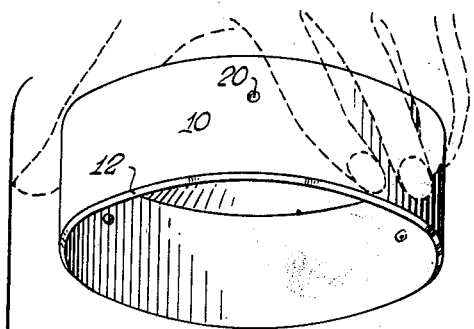
Fig. 3 is a perspective view of one form of mold or scalloping insert.

The molding or scalloping device 13 is preferably in the form of an insert and in the embodiment shown in Fig. 3 is preferably in the form of a split ring including a scalloped flange portion 14 having a cylindrical skirt or wall portion 16 split or cut as at 17 so that the ring may contract from a normally expanded condition to fit tightly into the sleeve portion of the holder 10.

Figure 2:
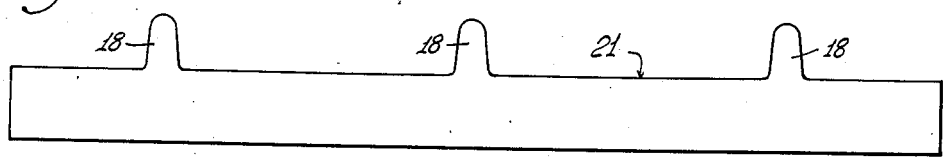
Fig. 2 is a plan view of a blank from which one form of cutter is stamped.

Means for removably holding the insert in place includes the provision of integral extensions or fingers 18 suitably spaced about the free peripheral edge portion of the skirt 16 and preferably biased so as to spring outwardly into frictional engagement with the inner surface portions of the holder, the metal of which the insert ring is constructed commonly being steel, which provides a sufficient springiness for smooth positive action of the fingers, as well as a proper expansibility of the ring itself. The insert of Fig. 3 is preferably stamped from a blank 21 such as shown in Fig. 2.

As an additional securing means, the several tabs or fingers 18 are provided with bosses 19 which interfit with complementary protrusions or bosses 20 (Fig. 1) stamped into the side walls of the holder 10. These are especially useful where the cutter is fitted around the flanged edge portion of a tin, since it would otherwise be possible under these circumstances to force the insert out of proper position into the holder.

Figure 4:
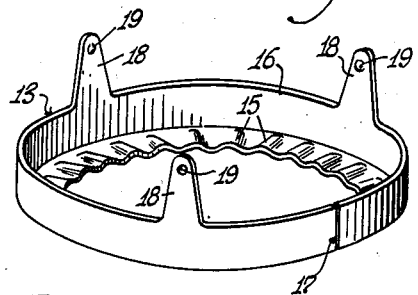
Fig. 4 is a perspective of a modified form of insert illustrating the application of a holder therewith.
Figure 5:
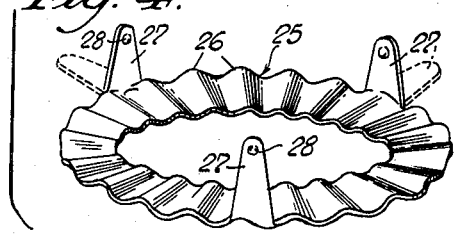
Fig. 5 is a fragmentary vertical section through a holder and part of the modified insert of Fig. 4.
Figure 5:
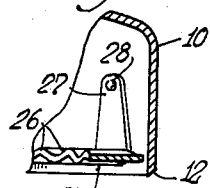

A modified form of insert is shown in Fig. 4 in which the mold is in the form of a ring 25 similarly provided with undulations 26 for producing scallops. Suitably spaced around the outer periphery of this ring are a plurality of upset attaching fingers 27 which may also be provided with locking bosses 28 to cooperate with the embossed parts 20 in the holder or cutter 10, the latter being shown in a position for placement over the insert.

If desired, the inserts may be permanently fixed in position in the cutter by means of spot welding, crimping, or the like.

Figure 6:
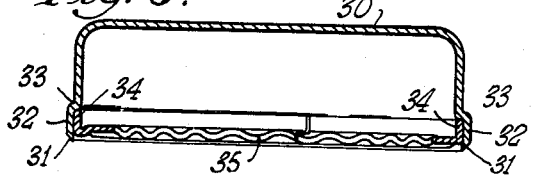
Fig. 6 is a vertical section through a modified form of holder for the mold insert.

In Fig. 6, there is shown a modified form of cutter or holder including a cylindrical or other form of recessed member 30 having a peripheral edge portion 31 constituting the cutting edge and further provided with an outwardly enlarged or offset wall portion 32 adjacent said edge and providing a shoulder portion 33 against which the upper rim portion 34 of a molding annulus 35 may bear to limit the inward movement of the mold or annulus upon insertion and in use.

The mold insert 35 is preferably of the split-ring variety shown in Fig. 3, with this difference, that the extensions or fingers 18 are not necessary and may preferably be omitted, although they may be offset inwardly for use in the cutter 30 shown in Fig. 6.

The expansibility of the molding insert 35 in the arrangement of Fig. 6 is sufficient to secure the same in position in the seating portion 32—33 of the holder. If desired, however, the insert may be permanently secured in place by means of spot welding, crimping or the like.

The type of insert shown in Fig. 4 may also be employed in the type of holder shown in Fig. 6 provided the finger extensions 27 are offset inwardly so as not to interfere with the shoulder 33.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. In a dough cutter including a cup-shaped cutter member, the combination with said member of a scalloping mold in the form of a split ring dimensioned for frictional insertion into the cutter member, frictionally engageable means between the ring and cutter removably securing the parts in assembled relation, said ring having an undulated flange portion for applying scallops to dough severed by the cutter.

2. In a dough cutter of the type including a cup-shaped cutter member, the combination with said member of a scalloping mold in the form of a split ring adapted to fit in frictional engagement within said cutter, said ring having an annular flange undulated to form scallops in the dough pressed within said cutter member, and complementary embossed parts on said mold and cutter member and adapted to removably lock the mold in operative position in the cutter member.

3. In a dough cutter, the combination with a cup-shaped cutter member of a scalloping mold in the form of an annulus provided with spaced fingers extending in parallelism with the axis of the annulus and further adapted to frictionally engage inner surface portions of said cutter member to secure said annulus removably in operative position therein, said annulus including an annular flange undulated to form scallops in dough pressed into said cutter member.

4. A scalloping mold adapted for use with a cup-shaped dough cutter, said mold including an annular skirt portion provided with an annular flange extending inwardly of the skirt portion around one edge thereof, said flange being undulated for the formation of scallops in dough engaged thereby, said skirt portion being dimensioned to fit frictionally into said cutter member for disposition removably in operative position therein and being provided with a plurality of spaced fingers extending in the direction of the axis thereof from the edge portion opposite that at which said flange is situated, said fingers being adapted to frictionally engage the inner surface portions of said cutter to hold said mold in operative position in the latter.

ANGELO NAPOLILLO.